United States Patent [19]

Fuke et al.

[11] 4,362,291

[45] Dec. 7, 1982

[54] METAL MOLD FOR MOLDING HOLLOW ARTICLE HAVING INWARDLY TAPERED SIDE WALL

[75] Inventors: Yasukiyo Fuke; Ryoichi Watanabe, both of Numazu, Japan

[73] Assignee: Toshiba Kikai Kabushiki Kaisha, Tokyo, Japan

[21] Appl. No.: 237,607

[22] Filed: Feb. 24, 1981

[30] Foreign Application Priority Data

Feb. 26, 1980 [JP] Japan .................................. 55-23576

[51] Int. Cl.³ ........................... B29C 1/06; B29C 1/16
[52] U.S. Cl. ..................................... 249/144; 249/63; 249/178; 249/184; 249/180; 425/438; 425/441; 425/577; 425/403; 425/DIG. 5; 425/DIG. 58
[58] Field of Search ............... 249/180, 63, 144, 178; 425/393, DIG. 5

[56] References Cited

U.S. PATENT DOCUMENTS

| | | | |
|---|---|---|---|
| 2,676,372 | 4/1954 | Venner et al. | 249/180 |
| 3,339,242 | 9/1967 | Lamb | 249/180 X |
| 3,373,460 | 3/1968 | Ladney | 249/63 X |
| 3,865,529 | 2/1975 | Guzzo | 249/180 X |
| 3,905,740 | 9/1975 | Lovejoy | 249/63 X |
| 4,019,711 | 4/1977 | Altenhof et al. | 249/180 X |
| 4,286,766 | 9/1981 | Von Holdt | 249/144 |

Primary Examiner—J. Howard Flint, Jr.
Attorney, Agent, or Firm—Koda and Androlia

[57] ABSTRACT

In a metal mold for molding a hollow product having inwardly tapered side wall with a stationary die plate for forming a bottom portion of the product, a core, and a cavity plate surrounding the core, the core has a truncated pyramid shape and first and second slide cores are provided between the core and the cavity plate. The core and slide cores are constructed such that at the time of opening the mold both slide cores are moved inwardly in an interlocked relation with retractive movement of the core thus leaving one end of the molded product for enabling removal thereof.

1 Claim, 7 Drawing Figures

METAL MOLD FOR MOLDING HOLLOW ARTICLE HAVING INWARDLY TAPERED SIDE WALL

BACKGROUND OF THE INVENTION

This invention relates to a metal mold for molding, and more particularly to a metal mold for molding a hollow article having relatively large size and having inwardly inclined side wall.

Medium or large size cylindrical molded product with one end opened while the other end closed and having inwardly tapered side wall has been difficult to mold as an integral body so that it has been the practice to separately mold the bottom portion and the side wall portion and then bond them into a unitary structure. This method, however, requires much time and labor thus not only increasing the cost of manufacturing but also decreasing the mechanical strength of the product and impairing its appearance. Accordingly, it has been desired to mold such a molded product with a single step.

SUMMARY OF THE INVENTION

Accordingly, it is an object of this invention to provide a metal mold capable of molding with a single step a molded product of medium and large size and having an inwardly tapered side wall.

According to this invention there is provided a metal mold for molding a hollow product having inwardly tapered side wall of the type wherein the product is molded with a stationary die plate for forming a bottom portion of the product, a core and a cavity plate surrounding the core, characterized in that the core has a truncated piramid shape, that first and second slide cores are provided between the core and the cavity plate, and that the core and slide cores are constructed such that at the time of opening the mold, both slide cores are moved inwardly in an interlocked relation with retractive movement of the core thus leaving one end of the molded product for enabling removal thereof.

BRIEF DESCRIPTION OF THE DRAWINGS

In the accompanying drawings

DESCRIPTION OF THE PREFERRED EMBODIMENTS

Figure 1:
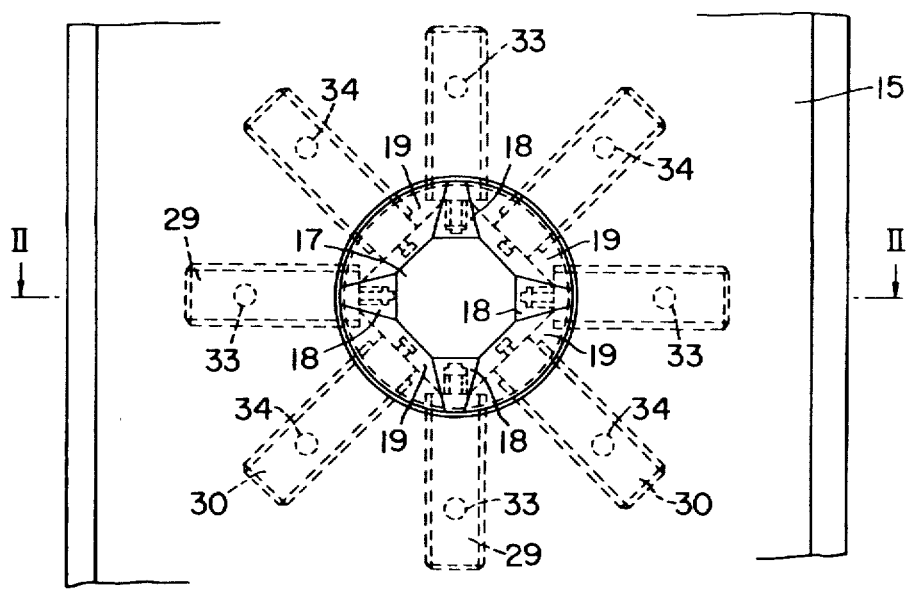
FIG. 1 is a plan view showing one embodiment of the invention with a mounting plate removed.
Figure 2:
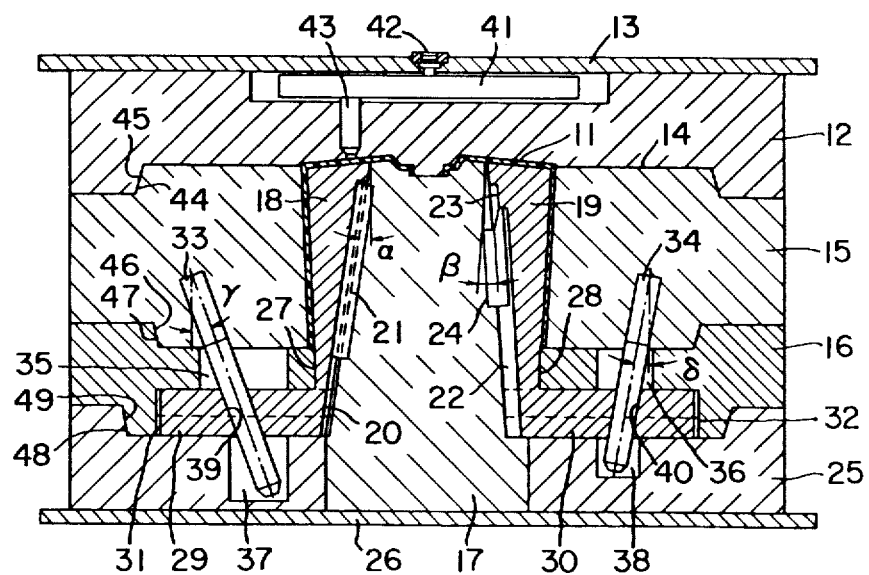
FIG. 2 is a sectional view taken along a line II—II shown in FIG. 1 and showing the metal mold in a closed state.
Figure 5:
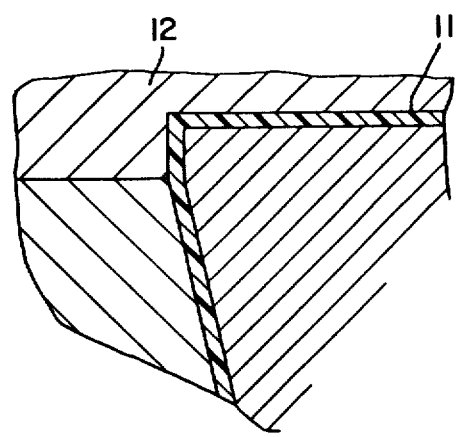
FIG. 5 is a sectional view showing a portion of a molded article having different configuration.

Referring now to FIGS. 1 and 2, the bottom portion of a molded product 11 is formed by a stationary die or mold plate 12 which is secured to an injection molding machine, not shown, through a stationary mounting plate 13 and held in contact with a cavity plate 15 through a contact or split surface 14. Where a portion of the side wall of the molded product is not tapered as shown in FIG. 5, the stationary die plate 12 may also form a portion of the side wall of the molded product 11.

The central portion of the cavity plate 15 forms the outer wall of the molded product 11 while the lower surface of the cavity plate is in contact with a slide guide plate 16. A core 17 disposed in the molded product 11 takes the form of a truncated piramid and is provided with a plurality of polygonal surfaces inclining at angles $\alpha$ and $\beta$ with respect to the vertical, and a plurality of slide cores 18 and 19 (in this embodiment, each 4) engage the inclined surfaces of the core. Each of the first slide cores 18 has substantially triangular or wedge shaped configuration with its inner surface wider than the outer surface (see FIG. 1) and a dovetail groove 20 provided for its inner surface in contact with the core 17. By fitting a dovetail 21 on the core 17 into the dovetail groove 20, the slide core 18 is slidable along a polygonal surface inclined at angle $\alpha$.

Each of the second slide cores 19 has also a wedge shaped configuration but with its inner surface narrower than the outer surface. At about the center of its inner flat surface of the slide core 19 in contact with the core 17 is provided a groove 22 adapted to receive a cotter 23 having an inclined surface. Another cotter 24 mating with the inclined surface of cotter 23 is secured to core 17. The inclined surfaces of both cotters 23 and 24 engage with each other whereby the slide core 19 would be strongly pulled against the core 17 when the mold is closed. Under this state, the slide core 18 is also urged against the core 17 by the wedge action of the cotters 23 and 24. The core is secured to a movable die plate 25 mounted on a movable mounting plate 26 secured to the movable die plate of an injection machine, not shown.

Narrow portions 27 and 28 are formed on the lower portions of the slide cores 18 and 19 and at the lower opening of the molded product are provided dovetails 29 and 30 beneath the narrow portions. By fitting the dovetails 29 and 30 in dovetail grooves 31 and 32 provided for the slide guide plate 16 the slide cores 18 and 19 can move in the horizontal direction but are prevented from moving in the vertical direction.

A pin 34 inclined at an angle $\delta$ with respect to the vertical is secured to the righthand side of the cavity plate 15, and a pin 33 inclined at an angle of $\gamma$ is secured to the lefthand side of the cavity plate 15. The lower ends of these inclined pins are received in loose or enlarged openings 35 and 36 of the slide guide plate 16, loose openings 37 and 38 of the movable die plate 25 and extend through openings 39 and 40 of the dovetails of the slide cores 18 and 19 respectively, thus permitting the slide cores 18 and 19 to move downwardly and inwardly to separate from the lower end of the molded product when the mold is opened.

Figure 3:
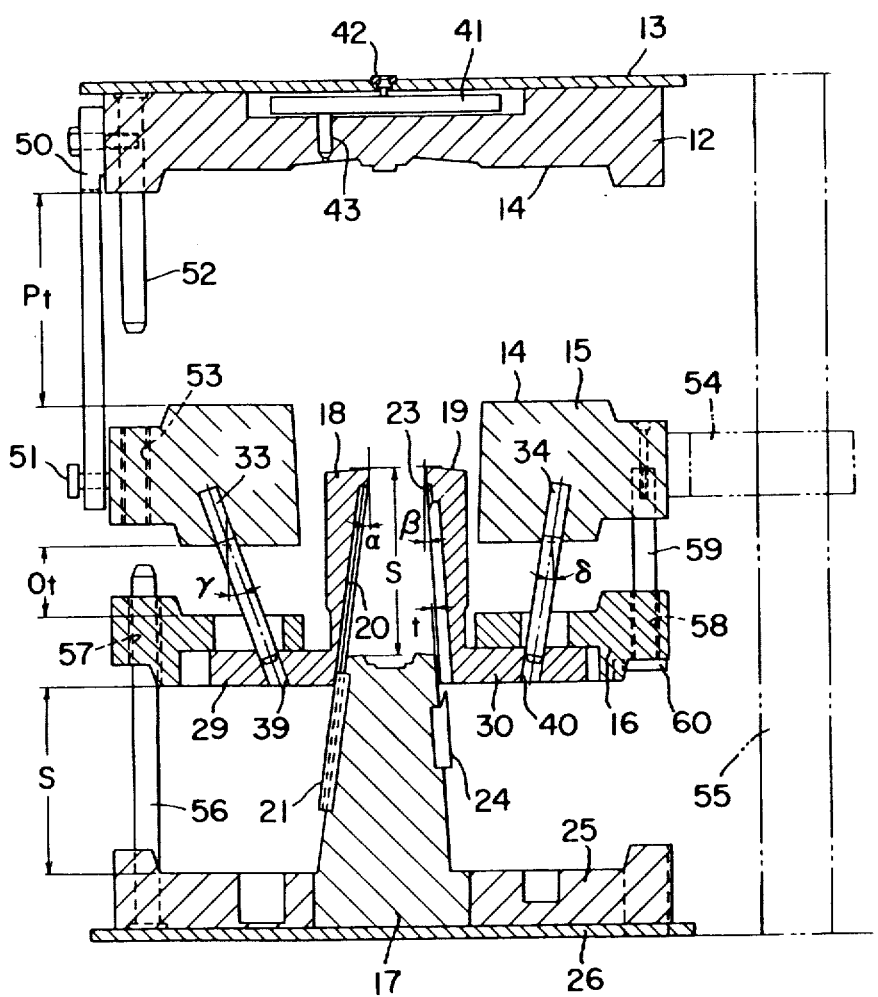
FIG. 3 is a sectional view corresponding to FIG. 2 but showing a state in which the mold is opened.

Well known hot runners 41–43 are provided. Inclined surfaces 44–49 are provided at the split surfaces between stationary die plate 12, cavity plate 15, slide plate 16 and movable die plate 25 for holding respective members at correct positions when the mold is closed. As shown in FIG. 3, a pin 52 is secured to the stationary mold plate 12 to be received in an opening 33 of the cavity plate 15 to accurately guide the initial movement thereof. An arm 54 is secured to the side surface of the cavity plate 15 and guided by tie bars 55 of the injection molding machine for guiding the cavity plate 15 after disengagement of the pin 52 from opening 53.

The vertical movement of the slide guide plate 16 is guided by inserting a pin 56 secured to the movable guide plate 25 into an opening 57 of the slidable guide plate 16. A pin 59 inserted in an opening 58 of the slide guide plate 16 is secured to the cavity plate 16 and a stop flange 60 is secured to the lower end of pin 59 to prevent slide cores 18 and 19 from disengaging inclined pins 33 and 34 when core 17 is accidentally retracted beyond a predetermined stroke.

The metal mold of this invention operates as follows: In the mold closed state shown in FIG. 2, the slide core 19 is strongly urged against the core 17 by cotters 23 and 24 between slide core 19 and core 17, while slide core 18 is urged against the core 17 by inclined surfaces between slide cores 18 and 19 so as to withstand resin pressure injected through hot runners 41-43.

A die opening operation will be described with reference to FIG. 3. As the movable die plate of the injection molding machine is moved downwardly, the core 17 is also moved downwardly. At this time, since cavity plate 15 readily disengage from the stationary die plate 12 at split surface 14, the core can be moved a predetermined distance Pt (to be described later) by embedding a compression spring, not shown, in the stationary die plate 12 to abut cavity plate 15 or by connecting cavity plate 15 and hence slide guide plate 16 to movable die plate 25 through a pawl or cam mechanism, not shown.

Figure 4:
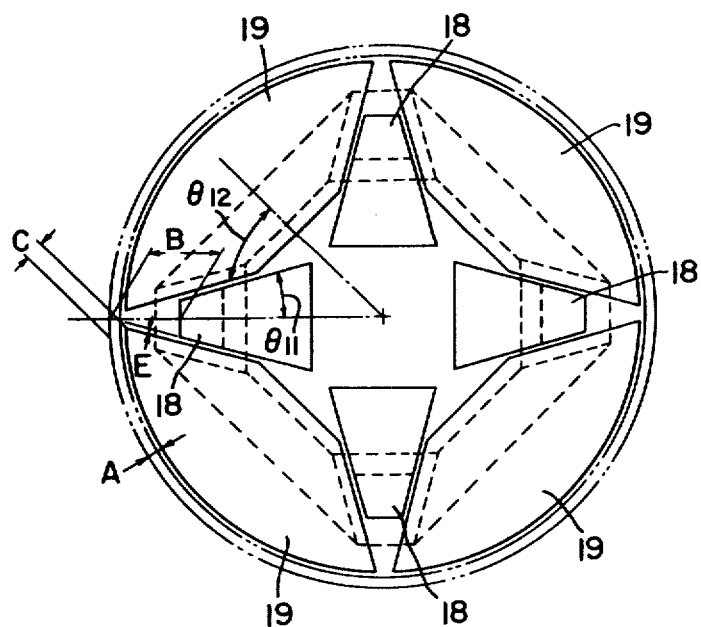
FIG. 4 is an enlarged plan view showing only the first and second slide cores.

After the cavity plate 15 has been moved over the distance of Pt, bolt 51 of the cavity plate 15 moving along a slot of lever 50 secured to the stationary die plate 12 is stopped, thus stopping the cavity plate 15. As the core 17 continues to descend, since the cavity plate 15 has been stopped, slide core 18 is prevented from descending together with core 17 by inclined pin 33 so that the slide core 18 is moved inwardly and descends along dovetail 21, the extent of inward movement being determined by the difference between angles $\gamma$ and $\alpha$. More particularly, as the core 17 moves from a point of stopping cavity plate 15 to the position shown in FIG. 3 over a distance of S+Ot, slide core 18 is separated from cavity plate 15 by a distance Ot, while core 17 stops at a position spaced S from the lower end of the dovetail 29 of the slide core 18. At this time, as shown in FIG. 4, slide core 18 moves inwardly over distance B determined by the angle $\gamma$ of the inclined pin 33. On the other hand, slide core 19 moves inwardly over distance C determined by angle $\delta$ of inclined pin 34. As shown in FIG. 4, these inward movements B and C are larger than the amount A of the inclination of the product so that slide cores 18 and 19 leave the lower end of the product.

Although in the foregoing embodiment dovetail slot 20 was provided for slide core 18 and dovetail 21 for core 17, this interfitting relation may be reversed. The same is true for slide cores 18 and 19 and slide guide plate 16. Furthermore, in the foregoing embodiment, the downward movement of the slide core 18 was guided by dovetail groove 20 thereof and dovetail 21 of core 17 while the downward movement of slide core 19 was guided by dovetail 29 of one slide core 18, dovetail 30 of another slide core 18 and dovetail grooves 31 and 32 of slide guide plate 16 so as to cause both slide cores 18 and 19 to move integrally.

Figure 6:
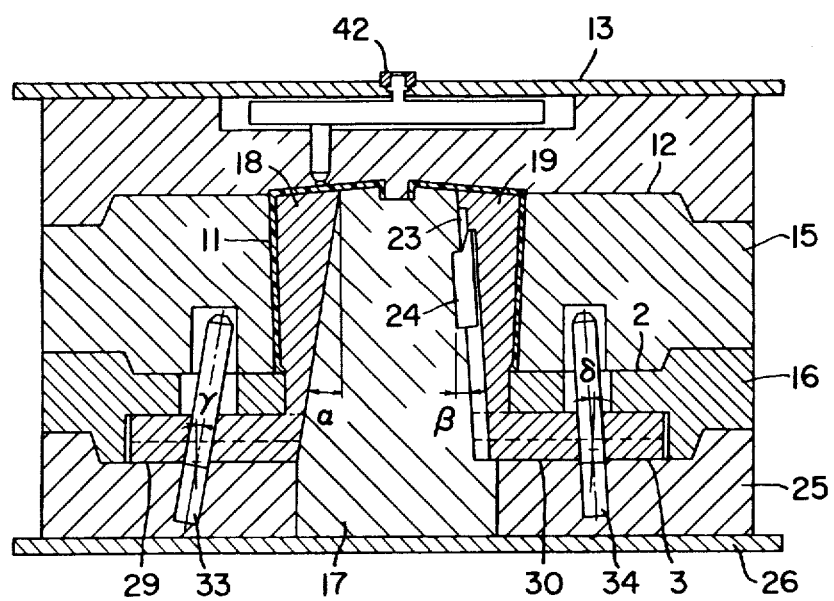
FIG. 6 is a sectional view showing another embodiment of this invention.

It is also possible to move downwardly slide cores 18 and 19 over the distance Ot through slide guide plate 16 by inserting a piston-cylinder assembly operating in the axial direction of the core 17 between the cavity plate 15 and slide guide plate 16. Although in the foregoing description inclination angles $\alpha$ and $\beta$ of the inclined surfaces of slide cores 18 and 19, and core 17 are different, angle $\beta$ may be made equal to larger angle $\alpha$.

Where the molded product 11 has no projection on the bottom as shown in FIG. 5, or as shown in FIG. 6 where the diameter of the bottom projection is smaller than the amount of the inclination of the molded product, slide cores 18 and 19 may be moved only in the lateral direction and are not required to move in the vertical direction. In this case, as shown in FIG. 6, the contact surface between slide core 18 and core 17 may be a simple plane and inclined pins 33 and 34 are fixed to the movable die plate 25 to extend through dovetails 29 and 30 of slide cores 18 and 19 respectively. Further, the slide guide plate 16 is bolted to cavity plate 15.

With the modification shown in FIG. 6, the cavity plate 15 stops after moving over the distance Pt. As the core 17 continues its downward movement, slide cores 18 and 19 merely move inwardly according to angle $\gamma$ and $\delta$ of the inclined pins 33 and 34 without moving further downwardly. Consequently, the molded article can be removed without being interfered by the inclined side wall.

Figure 7:
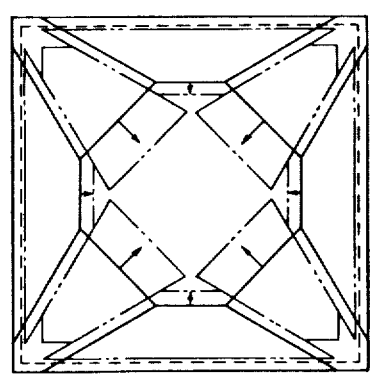
FIG. 7 is a plan view corresponding to FIG. 4 and showing slide cores for molding a product of different configuration.

With the metal die of this invention, it is also possible to mold a square molded product as shown in FIG. 7.

As above described according to the metal mold of this invention the inner surface of the molded product is formed by a truncated piramid shaped core and first and second slide cores brought into contact with the side surfaces of the core and the slide cores are constructed such that at the time of opening the mold both slide cores are moved inwardly in an interlocked relation with the retractive movement of the core thus leaving one end of the molded product for enabling removal thereof. This construction enables to mold in a single step a product having medium or large size and an inwardly tapered side wall.

I claim:

1. A metal mold for molding a hollow product having a narrow opening, a wide bottom plate and a side wall between said narrow opening and said bottom plate, said metal mold comprising:

a stationary mold plate secured to a stationary mounting plate of an injection molding machine and provided with a resin inlet runner for molding said bottom plate;

a movable cavity plate which is brought into contact with said stationary mold plate when said metal mold is closed and separated therefrom when said metal mold is opened;

means for moving said cavity plate in an axial direction of said mold over a stroke sufficient to remove a molded product from said stationary mold plate;

first and second pins secured to said movable cavity plate and oppositely inclined with respect to an axis of said mold;

a core to be located inside of said molded product and secured to a movable die plate of said injection molding machine, said core having a plurality of axially extending polygonal surfaces surrounding the same;

first slide cores which when said mold is closed engage with said polygonal surface of said core to form a portion of a side wall of said molded product, whereas when said mold is opened, said first slide cores are guided by said first pin to move together with said core toward the center of said mold over a stroke sufficient to remove said molded product in the axial direction and also to move in the radial direction;

first dove tail means disposed between one end of said first slide cores and said movable die plate and extending in a direction perpendicular to the axis of said core;

first and second cotters respectively having inclined surfaces parallel to said inclined polygonal surfaces;

second slide cores disposed adjacent said polygonal surfaces of said core, said second slide cores molding another portion of said side wall of said molded product together with said first slide cores when said mold is closed, said second and first slide cores being alternately arranged about said core, said first cotters being secured to said second slide cores, the inclined surfaces of said second cotters being caused to engage the inclined surfaces of said first cotters by said second pin when said mold is closed so as to urge said second slide core against said polygonal surfaces of said core; and second dove tail means disposed between one end of said second slide cores and said movable die plate and extending in a direction perpendicular to the axis of said core, said first and second dove tail means limiting axial movements of said first and second slide cores while guiding their radial movements.

* * * * *